United States Patent
Carrillo et al.

(10) Patent No.: US 10,516,316 B2
(45) Date of Patent: Dec. 24, 2019

(54) HOUSING FOR AN ELECTRIC MACHINE

(71) Applicant: Robert Bosch GmbH, Stuttgart (DE)

(72) Inventors: Camilo Carrillo, Stuttgart (DE); Karthick Govindasamy, Coimbatore (IN); Patrizia Schoellig-Alt, Kornwestheim (DE); Stephan Geise, Ruethen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/763,968

(22) PCT Filed: Jul. 25, 2016

(86) PCT No.: PCT/EP2016/067690
§ 371 (c)(1),
(2) Date: Mar. 28, 2018

(87) PCT Pub. No.: WO2017/054954
PCT Pub. Date: Apr. 6, 2017

(65) Prior Publication Data
US 2018/0278119 A1 Sep. 27, 2018

(30) Foreign Application Priority Data
Sep. 28, 2015 (DE) .................. 10 2015 218 620

(51) Int. Cl.
*H02K 5/18* (2006.01)
*H02K 5/20* (2006.01)
*H02K 5/173* (2006.01)

(52) U.S. Cl.
CPC .................. *H02K 5/18* (2013.01); *H02K 5/20* (2013.01); *H02K 5/1732* (2013.01)

(58) Field of Classification Search
CPC ........... H02K 5/18; H02K 5/20; H02K 5/1732
(Continued)

(56) References Cited

U.S. PATENT DOCUMENTS 3,371,613 A * 3/1968 Dahlgren ............... F04D 13/086
                                                                       417/368
4,412,146 A * 10/1983 Futterer ................... H02K 1/17
                                                                      310/154.04
(Continued)

FOREIGN PATENT DOCUMENTS

| CN | 101374582 A | 2/2009 |
|---|---|---|
| CN | 101663483 A | 3/2010 |

(Continued)

OTHER PUBLICATIONS

International Search Report for Application No. PCT/EP2016/067690 dated Nov. 29, 2016 (English Translation, 3 pages).

*Primary Examiner* — John K Kim
(74) *Attorney, Agent, or Firm* — Michael Best & Friedrich LLP

(57) ABSTRACT

A housing for an electric machine may include an outer housing (2), an inner housing (3) arranged in the outer housing (2) and an intermediate casing space (5) formed between the outer housing (2) and the inner housing (3) as seen in a radial direction with respect to a stator axis (4). The outer housing and the inner housing (2, 3) may be pot-shaped and in each case have a base (9, 10) such that a base intermediate space (11) is formed between the base (9) of the outer housing (2) and the base (10) of the inner housing (3). The housing may further include a plurality of cooling ribs (8) running in an axial direction in the intermediate casing space (5) such that the cooling ribs extend into the base intermediate space (11) and run in a radial direction in the base intermediate space (11).

14 Claims, 3 Drawing Sheets

(58) Field of Classification Search
USPC .................................. 310/52, 54, 58, 89, 90
See application file for complete search history.

(56) References Cited

U.S. PATENT DOCUMENTS

| | | | | |
|---|---|---|---|---|
| 5,616,973 | A * | 4/1997 | Khazanov | H02K 5/20 310/54 |
| 6,160,332 | A | 12/2000 | Tsuruhara | |
| 6,657,337 | B1 * | 12/2003 | Delevallee | H02K 5/10 310/154.01 |
| 7,730,698 | B1 | 6/2010 | Montano et al. | |
| 8,147,216 | B2 * | 4/2012 | Schiffhauer | F04B 17/03 310/54 |
| 9,046,087 | B2 * | 6/2015 | Schiffhauer | B08B 3/026 |
| 2004/0066100 | A1 | 4/2004 | Vlemmings et al. | |
| 2004/0091373 | A1 * | 5/2004 | Terry | F04D 29/20 417/368 |
| 2007/0175815 | A1 * | 8/2007 | Thomas | B01D 29/21 210/451 |
| 2009/0026857 | A1 | 1/2009 | Lavall | |
| 2010/0047091 | A1 * | 2/2010 | Schiffhauer | F04B 17/03 417/410.1 |
| 2012/0313465 | A1 | 12/2012 | Prix | |
| 2015/0069862 | A1 | 3/2015 | Bulatow | |
| 2015/0076940 | A1 * | 3/2015 | Ohashi | H02K 1/185 310/58 |
| 2017/0313305 | A1 | 11/2017 | Irion et al. | |
| 2018/0278119 | A1 * | 9/2018 | Carrillo | H02K 5/18 |

FOREIGN PATENT DOCUMENTS

| | | |
|---|---|---|
| CN | 202309336 U | 7/2012 |
| CN | 104247226 A | 12/2014 |
| DE | 19624519 | 1/1998 |
| DE | 19854466 C1 | 4/2000 |
| DE | 19939013 | 7/2000 |
| DE | 10018470 | 10/2001 |
| DE | 10141693 | 3/2003 |
| DE | 10141891 | 3/2003 |
| DE | 10338451 | 3/2005 |
| DE | 102004019110 | 11/2005 |
| DE | 102005052363 | 5/2007 |
| DE | 102010008584 | 8/2011 |
| DE | 102012205754 | 1/2013 |
| DE | 102014221754 | 4/2016 |
| DE | 102015205591 | 9/2016 |
| DE | 102015207010 | 10/2016 |
| EP | 1199786 | 4/2002 |
| EP | 1271747 | 1/2003 |
| EP | 2122166 | 11/2009 |
| JP | 2006027671 A | 2/2006 |

* cited by examiner

HOUSING FOR AN ELECTRIC MACHINE

BACKGROUND OF THE INVENTION

The invention relates to a housing for an electric machine.

A housing for an electric machine is known from the German patent application DE 10 2005 052 363 A1, having a pot-shaped outer housing, a pot-shaped inner housing arranged in the outer housing and an intermediate casing space formed between the outer housing and the inner housing in a radial direction with respect to the stator axis, in which cooling ribs, running in the circumferential direction with respect to the stator axis, are provided to form a cooling channel running in a spiral shape. A base intermediate space is formed between the base of the outer housing and the base of the inner housing. A bearing for the rotor shaft is provided in the base of the inner housing and is heated by heat from the electric machine. The spiral-shaped cooling channel for cooling the bearing for the rotor shaft is not guided into the base intermediate space. The cooling of the bearing for the rotor shaft can thus still be improved. In addition, the production costs for a housing of this type are comparatively high, as the cooling ribs are formed as a separate part and have to be inserted into the intermediate casing space.

SUMMARY OF THE INVENTION

The housing according to the invention has by comparison the advantage that the cooling of the bearing arranged in the base of the inner housing is improved by a plurality of cooling ribs running in the axial direction being provided in the intermediate casing space, said cooling ribs extending into the intermediate casing space and running in the radial direction in the intermediate casing space. In addition, production costs are reduced, as the plurality of cooling ribs running in the axial direction is easily deformable in contrast to the spiral-shaped cooling ribs, and can therefore be integrally formed on the outer or inner housing.

According to one advantageous embodiment, the cooling ribs are integrally formed on the outer housing as the cooling channels can be particularly easily and cost effectively produced in this way.

It is particularly advantageous for the cooling ribs, starting at the intermediate casing space, to run continuously in each case into the base intermediate space, because a meander-shaped profile of the cooling channel involving an end face of the housing can be achieved. As a result, a better cooling of the base of the inner housing and the bearing disposed in the base of the inner housing is achieved.

It is furthermore advantageous if the cooling ribs are arranged and designed in such a way that a cooling channel results, which runs in a meander-shaped manner from a cooling channel inlet to a cooling channel outlet. In this way, the production costs for the housing of the electric machine are reduced.

It is very advantageous if pairs of adjacent cooling channels are provided which have a through opening that connects the two cooling channels in the base intermediate space, as in this way a deflection of the cooling channel is achieved in the base intermediate space.

It is also advantageous if the inner housing has a base shoulder which extends in a direction facing away from the outer housing and in which a base shoulder of the outer housing projects in a sealing manner and that the inner housing has a shoulder, which extends to the inner circumference of the outer housing, at the end face thereof facing away from the base. An enclosed space is formed between the outer housing and the inner housing by means of this embodiment, said enclosed space being denoted as the cooling intermediate space and comprising the intermediate casing space and the base intermediate space.

It is furthermore advantageous if the outer housing is made from aluminum or plastic, in particular polyamide or polypropylene because the outer housing including the cooling ribs integrally formed thereon can in this way be particularly cost effectively manufactured by casting or injection molding.

It is furthermore advantageous if the plastic of the outer housing contains glass fibers and/or a foam structure. The outer housing becomes more mechanically stable and becomes deformed less as a result of the glass fibers provided in the material of the outer housing, so that the inner housing rests on the cooling ribs of the outer housing while maintaining form and position tolerances and seals said ribs to a great extent so that no or only small leaks occur in the meander-shaped cooling channel. A damping effect on the outer housing is achieved by means of a foam structure of the material of the outer housing, so that undesired noises from components adjacent to the outer housing are prevented. In addition, the foam prevents the shrinking and the warpage of the outer housing when said outer housing is cooled down in the injection molding tool. The foam structure of the outer housing is achieved by a foaming agent being added to the plastic to be foamed. After production, the wall of the outer housing has a foamed core with a compact edge layer in cross-section.

It is advantageous if the inner housing is made from sheet metal, in particular sheet steel, because the inner housing has thus a particularly good heat conductivity in order to effectively be able to remove the heat from the bearing via the cooling channel of the housing. In addition, the inner housing can be cost effectively manufactured in this way, for example by deep-drawing. Furthermore, an inner housing made from sheet metal has a high thermal resistance.

BRIEF DESCRIPTION OF THE DRAWINGS

An exemplary embodiment of the invention is depicted in a simplified manner and described in greater detail in the following description.

In the drawings.

DETAILED DESCRIPTION

Figure 1:
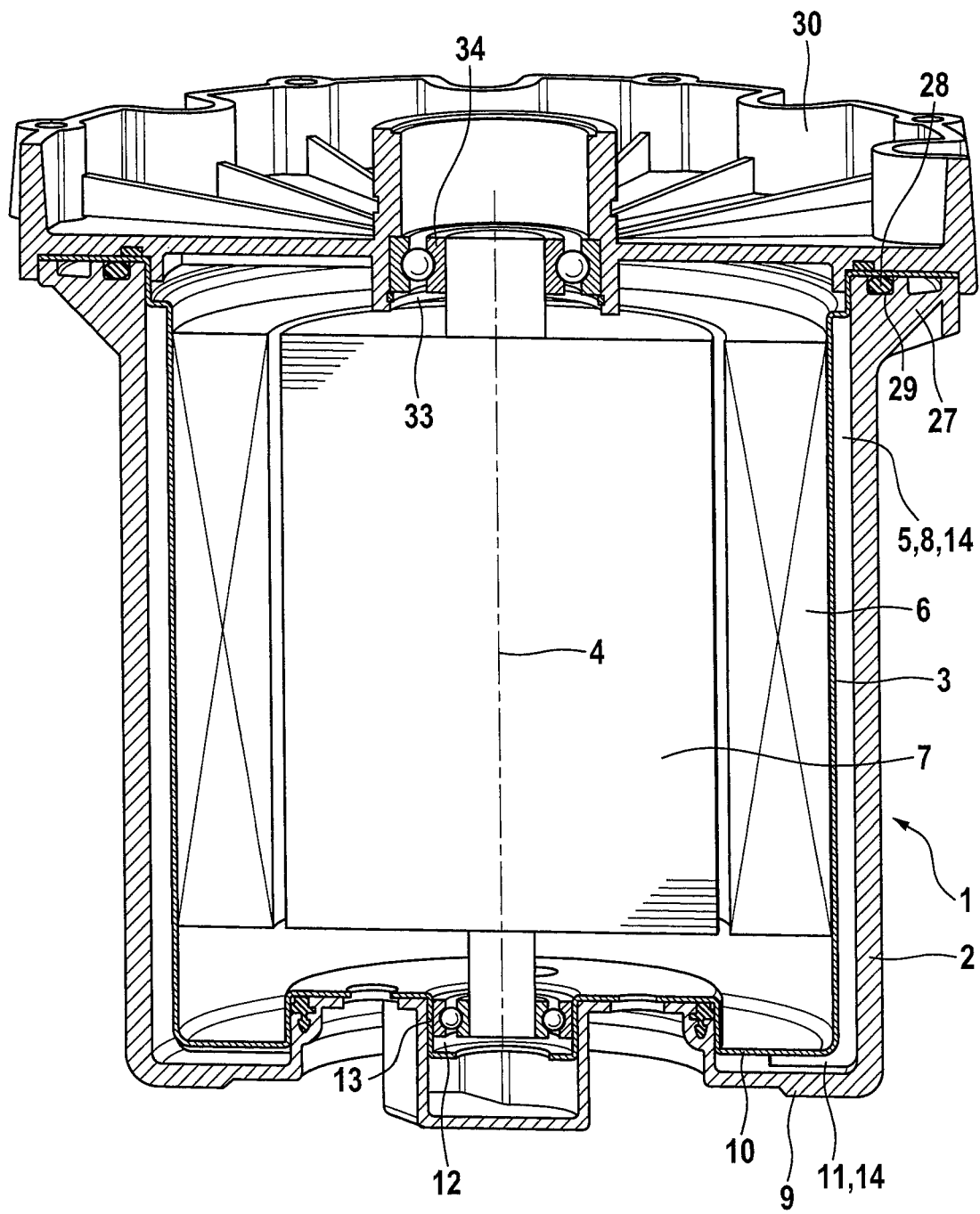
FIG. 1 shows a sectional view of the housing according to the invention.

FIG. 1 shows a sectional view of the housing according to the invention.

The housing 1 according to the invention is a housing of an electric machine and is used to receive a stator 6 and a rotor 7 of the electric machine and to remove the heat of the electric machine.

The housing 1 comprises an outer housing 2 and an inner housing 3 arranged in the outer housing 2. An intermediate casing space 5, in which cooling ribs 8 are provided, is formed between the outer housing 2 and the inner housing 3 as seen in a radial direction with respect to a stator axis 4.

The outer housing 4 and the inner housing 3 are in each case designed pot-shaped and have respectively a base 9, 10.

A base intermediate space 11, which is fluidly connected to the intermediate casing space 5, is formed between the base 9 of the outer housing 2 and the base 10 of the inner housing 3. In this way, the intermediate casing space 5 and the base intermediate space 11 form a continuous cooling intermediate space 14.

A receiving area 12 for a rotor shaft bearing 13, for example a roller bearing, is provided at the base 10 of the inner housing 3.

Figure 2:
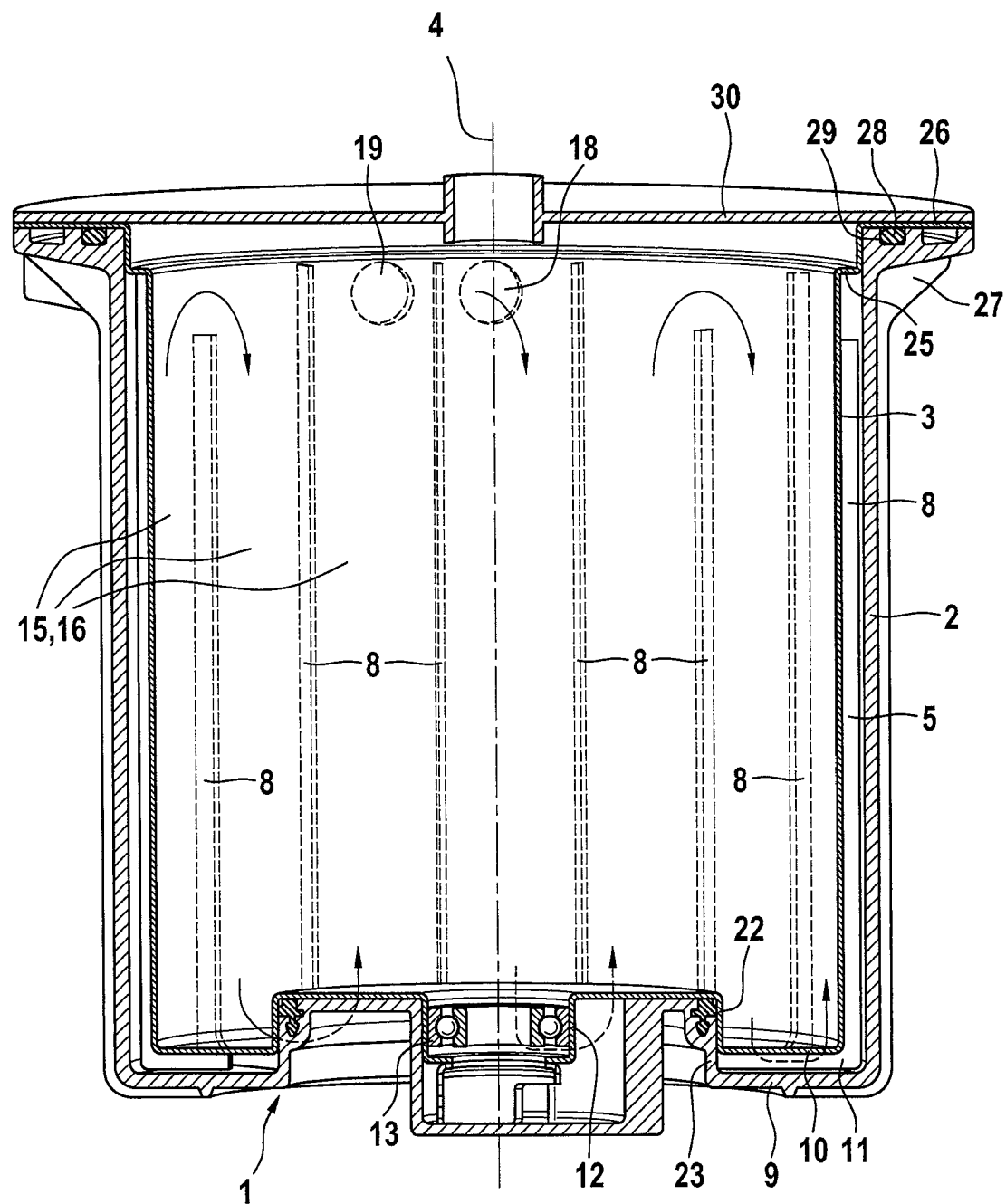
FIG. 2 shows a further sectional view of the housing according to FIG. 1.

FIG. 2 shows a further sectional view of the housing 1 according to FIG. 1, in which the stator 6 and the rotor 7 are not depicted.

According to the invention, a plurality of cooling ribs 8 is provided in the circumferential direction of the housing 1, spaced apart from one another and running in the axial direction. Said cooling ribs extend into the base intermediate space 11 and run in the radial direction in the base intermediate space 11. The cooling ribs 8 divide the cooling intermediate space 14 into a meander-shaped cooling channel 15. The cooling ribs 8 are therefore arranged and formed in the cooling intermediate space 14 such that the cooling channel 15 runs from a cooling channel inlet 18 to a cooling channel outlet 19 in a meander-shaped manner. The cooling channel inlet 18 and the cooling channel outlet 19 are, for example, arranged on the circumference of the outer housing 2.

According to the exemplary embodiment, the cooling ribs 8, including the rib sections extending into the base intermediate space 11, are integrally formed on the outer housing 2. In so doing, the cooling ribs 8 run, starting from the intermediate casing space 5, in each case continuously into the base intermediate space 11, in other words starting from the inner circumference of the outer housing 2 continuously up until the inner side of the base 9 of the outer housing 2 that faces the inner housing 3.

The outer housing 2 is, for example, made from aluminum or plastic, in particular polyamide or polypropylene. As a result, the outer housing 2 with the cooling ribs 8 that are integrally formed thereon can be cost effectively manufactured by casting or injection molding. The plastic of the outer housing 2 can contain glass fibers and/or have a foam structure. The glass fibers can, for example, be glass fibers having a length between 3 to 10 mm. The foam structure is achieved in the material of the outer housing 2 by a foaming agent being added to the plastic to be foamed during the injection molding process.

The pot-shaped inner housing 3 rests on the cooling ribs 8 in such a way that no or only small leaks occur between adjacent cooling channel sections 16.

During operation of an electric machine comprising the housing 1 according to the invention, the rotor shaft bearing 13 heats up, wherein the heat from the rotor shaft bearing 13 can be transported off via the inner housing 3 by means of thermal conduction to the base intermediate space 11 and from there via the meander-shaped cooling channel 15. In order to achieve a good thermal conduction, the inner housing 2 can be manufactured from sheet metal, in particular sheet steel.

The inner housing 3 has a base shoulder 22 at the base 10 thereof running in the direction facing away from the base 9 of the outer housing 2. A base shoulder 23 of the outer housing 2 projects in a sealing manner into said base shoulder 22 of the inner housing 3. Furthermore, the inner housing 3 has a shoulder 25 on the end face thereof facing away from the base 10, said shoulder 25 extending to the inner circumference of the outer housing 2. In so doing, an enclosed cooling intermediate space 14 is formed between the outer housing 2 and the inner housing 3. The shoulder 25 of the inner housing 3 rests against the outer housing 2 and has a shoulder 26, which abuts against a flange-like shoulder 27 of the outer housing 2, on the end thereof facing away from the base 10. A seal 28, in particular a sealing ring, is provided between the shoulder 26 of the inner housing 3 and the shoulder 27 of the outer housing 2. The seal 28 is, for example, disposed in an annular groove 29 of the shoulder 27 of the outer housing 2. The pot-shaped outer and inner housing 2, 3 is sealingly closed at the open end face by a housing cover 30, on which a second receiving area 33 for as second rotor shaft bearing 34 can be provided.

Figure 3:
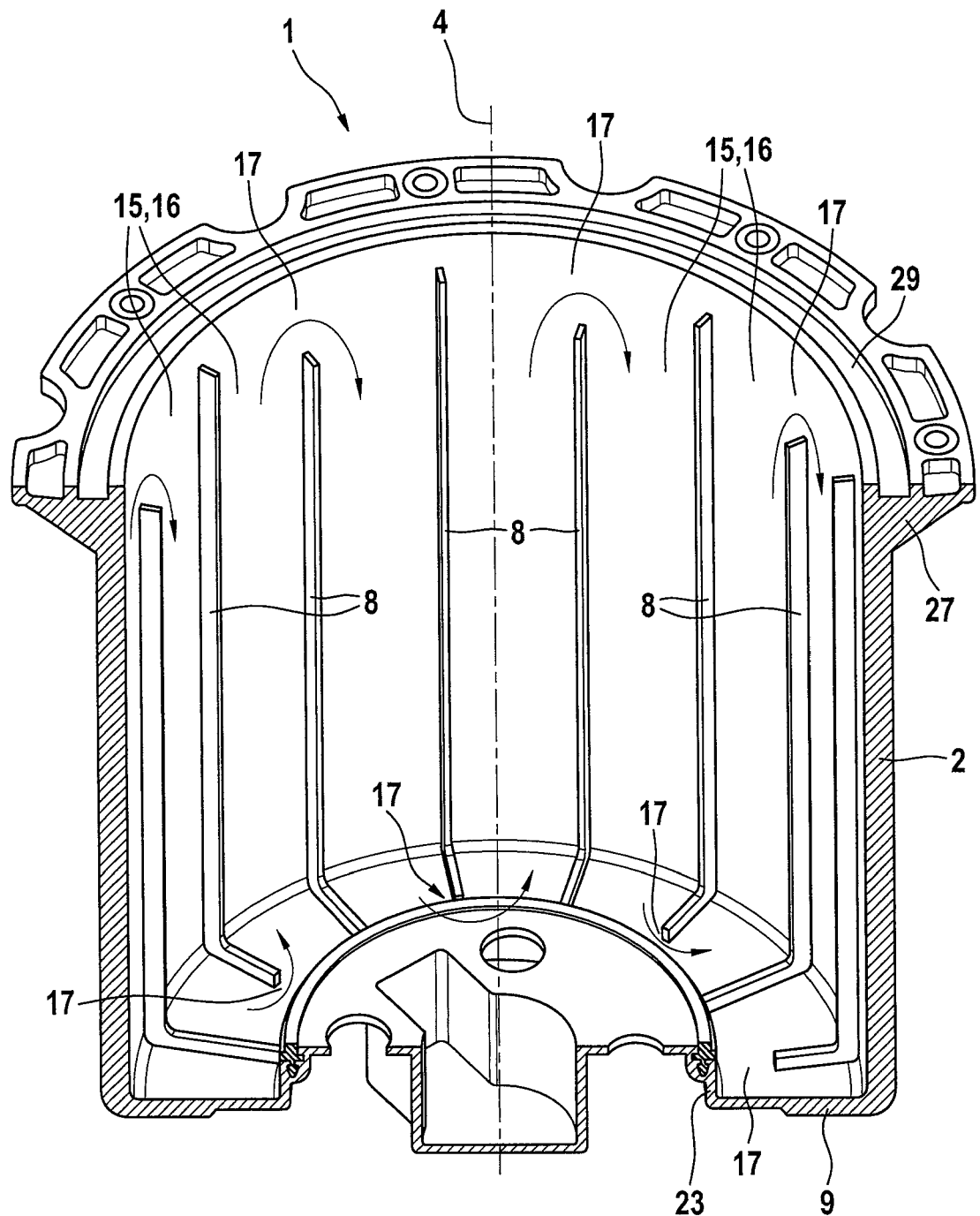
FIG. 3 shows a sectional view of the outer housing according to FIG. 1.

FIG. 3 shows a sectional view of the outer housing according to FIG. 1.

Pairs of adjacent cooling channel sections 16 formed between the cooling ribs 8 are provided in the cooling intermediate space 14, said pairs of cooling channel sections having a through opening 17 connecting the two cooling channel sections 16 in the base intermediate space 11. According to the exemplary embodiment, the cooling ribs run, as seen in the circumferential direction, alternately either up to the base shoulder 23 of the outer housing 2 or end in front of the base shoulder 23 of the outer housing 2 in the base intermediate space 11, in order to form in each case the through opening 17 to one of adjacent cooling channel sections 16 and thus form the meander-shaped cooling channel 15.

In addition, other pairs of adjacent cooling channel sections 16 formed between the cooling ribs 8 are provided in the cooling intermediate space 14, which have in each case one through opening 17 connecting the two cooling channel sections 16 at the end face of the housing 1 facing away from the bases 9, 10.

The invention claimed is:

1. A housing for an electric machine, the housing comprising an outer housing (2), an inner housing (3) arranged in the outer housing (2) and an intermediate casing space (5) formed between the outer housing (2) and the inner housing (3) as seen in a radial direction with respect to a stator axis (4), wherein the outer housing and the inner housing (2, 3) are pot-shaped and in each case have a base (9, 10), wherein a base intermediate space (11) is formed between the base (9) of the outer housing (2) and the base (10) of the inner housing (3), the housing further comprising a plurality of cooling ribs (8) running in an axial direction in the intermediate casing space (5), wherein the plurality of cooling ribs (8) extend into the base intermediate space (11) and run in a radial direction in the base intermediate space (11), the plurality of cooling ribs (8) forming a plurality of pairs of adjacent cooling channel sections (16), wherein each of the plurality of pairs of adjacent cooling channel sections (16) comprises a through opening (17) in the base intermediate space (11), the through opening (17) connecting each cooling channel section (16) in a given pair of adjacent cooling channel sections (16), and wherein the through opening (17) is at least partially defined by at least one of the plurality of cooling ribs (8).

2. The housing according to claim 1, characterized in that the cooling ribs (8) are integrally formed on the outer housing (2).

3. The housing according to claim 1, characterized in that the cooling ribs (8), starting from the intermediate casing space (5), run continuously in each case into the base intermediate space (11).

4. The housing according to claim 1, characterized in that the cooling ribs (8) are arranged in such a way that a cooling channel (15) results, wherein the cooling channel runs from a cooling channel inlet (18) in a meander-shaped manner to a cooling channel outlet (19).

5. The housing according to claim 1, characterized in that the outer housing (2) comprises plastic.

6. The housing according to claim 5, characterized in that the plastic of the outer housing (2) contains glass fibers and/or a foam structure.

7. The housing according to claim 1, characterized in that the inner housing (2) comprises sheet metal.

8. An electric machine comprising a housing according to claim 1.

9. The electric machine according to claim 8, further comprising a stator and a rotor within the inner housing.

10. The housing according to claim 1, characterized in that the outer housing (2) comprises polyamide or polypropylene.

11. The housing according to claim 10, characterized in that the polyamide or polypropylene of the outer housing (2) contains glass fibers and/or a foam structure.

12. The housing according to claim 1, characterized in that the outer housing (2) comprises aluminum.

13. The housing according to claim 1, characterized in that the inner housing (2) comprises sheet steel.

14. A housing for an electric machine, the housing comprising an outer housing (2), an inner housing (3) arranged in the outer housing (2) and an intermediate casing space (5) formed between the outer housing (2) and the inner housing (3) as seen in a radial direction with respect to a stator axis (4), wherein the outer housing and the inner housing (2, 3) are pot-shaped and in each case have a base (9, 10), wherein a base intermediate space (11) is formed between the base (9) of the outer housing (2) and the base (10) of the inner housing (3), wherein the inner housing (3) has a base shoulder (22) at the base (10) thereof, wherein the base shoulder (22) runs in a direction facing away from the base (9) of the outer housing (2), wherein a base shoulder (23) of the outer housing (2) sealingly protrudes into the base shoulder (22) of the inner housing, and wherein the inner housing (3) comprises a shoulder (25) that extends to an inner circumference of the outer housing on an end face thereof facing away from the base (10), the housing further comprising a plurality of cooling ribs (8) running in an axial direction in the intermediate casing space (5), wherein the plurality of cooling ribs (8) extend into the base intermediate space (11) and run in a radial direction in the base intermediate space (11).

* * * * *